United States Patent [19]

McKibben

[11] 4,249,112
[45] Feb. 3, 1981

[54] DYNAMIC FOCUS AND ASTIGMATISM CORRECTION CIRCUIT

[75] Inventor: Barry A. McKibben, Beaverton, Oreg.

[73] Assignee: Tektronix, Inc., Beaverton, Oreg.

[21] Appl. No.: 76,533

[22] Filed: Sep. 18, 1979

[51] Int. Cl.³ .............................................. H01J 29/58
[52] U.S. Cl. .................................... 315/382; 315/370
[58] Field of Search ......................... 315/382, 368, 370

[56] References Cited

U.S. PATENT DOCUMENTS

| | | | |
|---|---|---|---|
| 2,951,965 | 9/1960 | Durnal | 315/382 |
| 3,403,289 | 9/1968 | Garry | 315/370 X |
| 3,422,305 | 1/1969 | Infante | 315/382 |
| 3,465,137 | 9/1969 | Brouillette, Jr. et al. | 315/382 X |
| 3,772,566 | 11/1973 | Schwartz | 315/370 |
| 3,942,067 | 3/1976 | Cawood | 315/368 X |
| 3,943,279 | 3/1976 | Austefjord | 315/368 X |
| 3,961,223 | 6/1976 | Ray et al. | 315/382 X |

*Primary Examiner*—Malcolm F. Hubler
*Attorney, Agent, or Firm*—William D. Haffner

[57] ABSTRACT

A dynamic focus system for a cathode ray tube display system is described. In some cathode ray tubes an electrostatic or electromagnetic stigmator is driven by a correction signal derived from the beam deflection signals. The required signal is proportional to the product of the horizontal and vertical deflection signals. The described system incorporates a means for making the constant of proportionality independently adjustable for each quadrant of the cathode ray tube screen.

5 Claims, 3 Drawing Figures

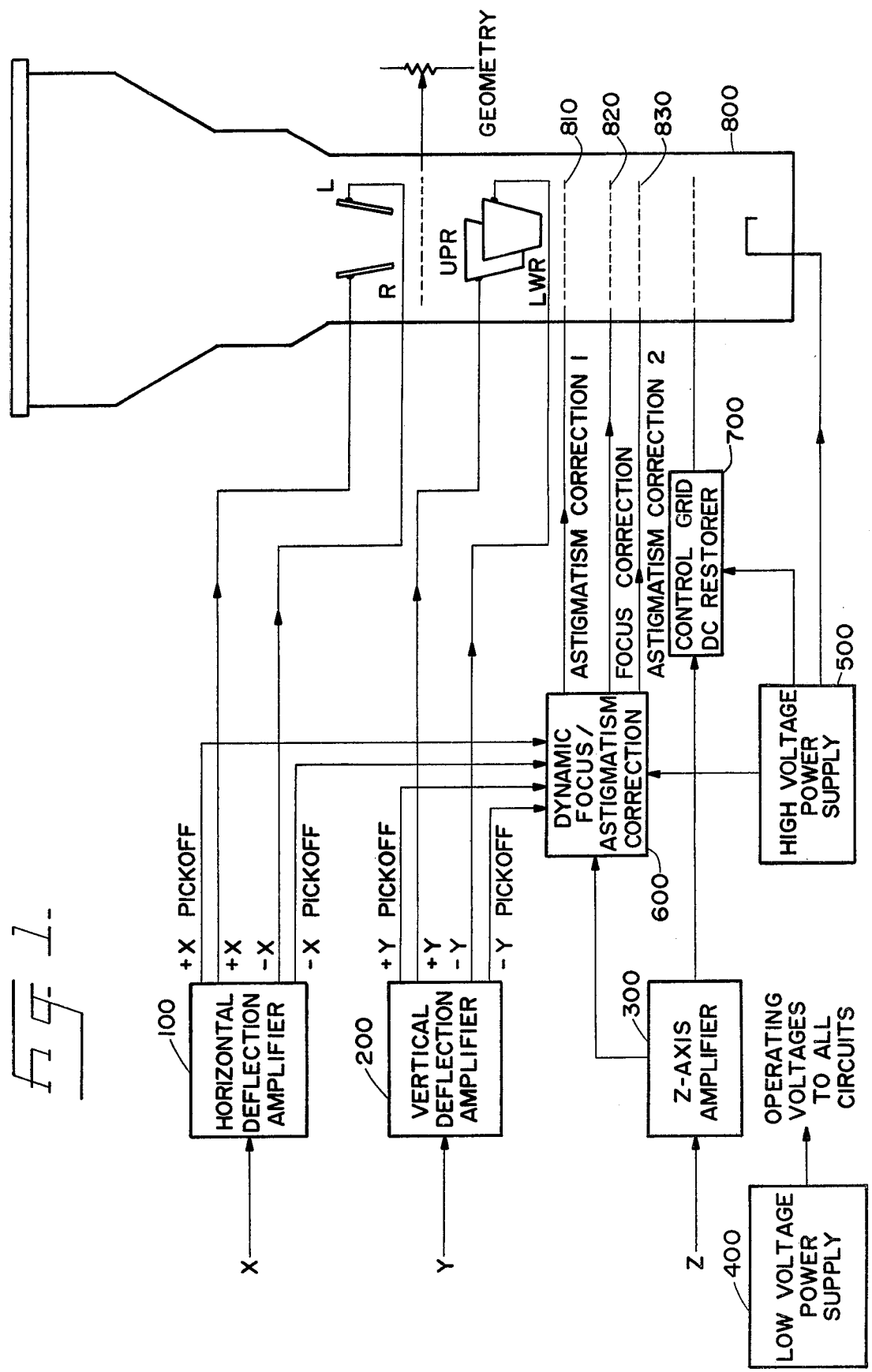

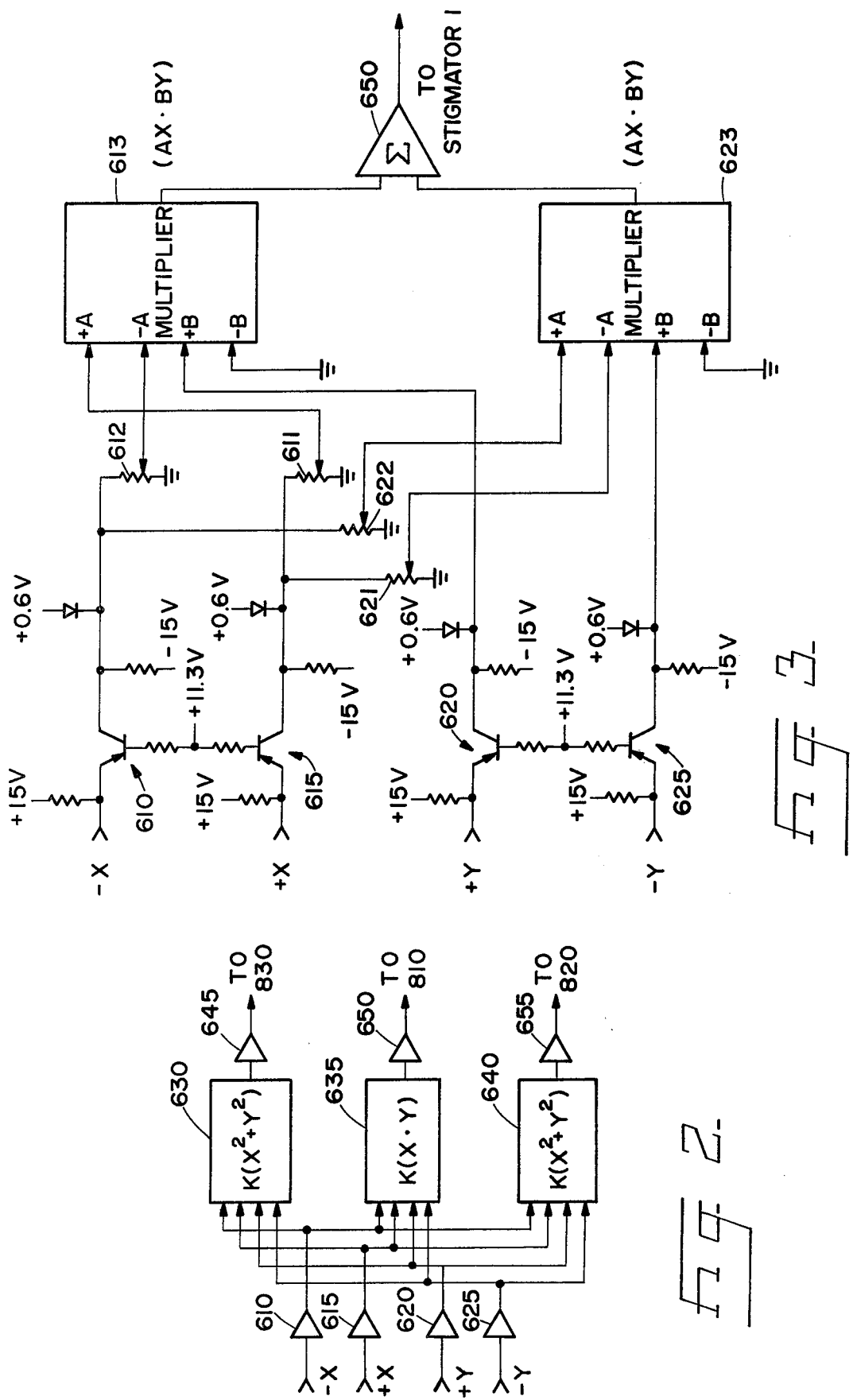

DYNAMIC FOCUS AND ASTIGMATISM CORRECTION CIRCUIT

BACKGROUND OF THE INVENTION

The present invention relates to cathode-ray tube circuits in general, and in particular to a dynamic focus and astigmatism correction circuit for cathode-ray tubes having electromagnetic or electrostatic deflection systems.

The focusing of an electron beam by electric or magnetic fields in a cathode-ray tube, hereinafter abbreviated CRT, is closely analogous to the focusing of light rays in an optical system. Not surprisingly, the electro-optical system of a CRT is plagued by distortions very similar to those which plague optical systems.

Two of the more troublesome distortions are defocusing and astigmatism. Astigmatism is a focal defect in which the electrons in different axial planes come to focus at different points. Under these conditions the CRT spot is not round, thus causing different trace widths depending upon the direction of the trace. More information concerning the various CRT distortions may be found in *The Cathode-Ray Tube*, by G. Parr and O. H. Davie, Reinhold, 1959, which is herein incorporated by reference. Numerous schemes have been developed to dynamically correct for the CRT distortions.

The article "Correction of Deflection-Abberations by Analog Computer" by K. Schlesinger and R. A. Wagner in Vol. 112, No. 8, *IEEE Transactions on Electron Devices*, which is herein incorporated by reference, describes a system for dynamic control of focus and astigmatism. A complex analog computer containing special-purpose computing tubes is used to generate the signals required to correct the display. One of the signals generated corrects for corner astigmatism. Because of variations in the CRT screen, it is desirable to have separate astigmatism correction for each corner of the screen. The circuit of Schlesinger and Wagner, however, contains no provision for such individual adjustment.

SUMMARY OF THE INVENTION

According to my invention a dynamic focus system for a CRT display includes means for individually adjusting astigmatism correction signals in each corner of the CRT screen. Signals proportional to the X and Y deflections of the electron beam from the center of the CRT screen are applied to four absolute value circuits (two for each deflection axis). The absolute value circuits associated with the X deflection signals drive two differential-input four quadrant multipliers through four variable gain controls. The absolute value circuits associated with the Y deflection signals drive the same multipliers directly. The multipliers operate to produce a correction signal which is proportional to the product of the X and Y deflections of the beam from the CRT center. The constant of proportionality is made independently adjustable for each quadrant of the CRT screen by the variable gain controls.

It is therefore an object of my invention to provide a simple method for generating corner astigmatism correction signals in a dynamic focus correction system.

It is another object of my invention to provide an astigmatism correction signal which is individually adjustable in each quadrant of the CRT screen.

It is another object of my invention to provide a dynamic astigmatism correction system in which corner astigmatism correction does not interfere with on-axis astigmatism correction.

BRIEF DESCRIPTION OF THE DRAWINGS

Various features and advantages of the present invention will become apparent upon consideration of the following description, taken in conjunction with the accompanying drawings wherein:

FIG. 1 is the block diagram of a display system in which the present invention may be incorporated;

FIG. 2 is a block diagram of dynamic focus and astigmatism correction circuit 600 of FIG. 1; and FIG. 3 is a combination schematic and block diagram of the dynamic astigmatism correction circuit of the present invention.

DETAILED DESCRIPTION OF THE PREFERRED EMBODIMENT

Refer to FIG. 1 wherein I have illustrated an X-Y display system incorporating my invention. The following description of FIG. 1 is provided to aid in understanding the general environment in which my invention functions.

Horizontal (X) and vertical (Y) signals to be displayed on CRT 800 are first fed to deflection amplifiers 100 and 200, respectively. The deflection amplifiers process the input signals and provide push-pull outputs to drive the deflection plates of CRT 800. Each deflection amplifier may contain position and gain controls.

The Z-axis amplifier 500 controls display intensity by providing a voltage to the control grid of CRT 800 through control grid d.c. restorer circuit 700. An external intensity control is usually provided to control the static brightness of the display.

The dynamic focus and astigmatism correction circuit 600 provides focus and astigmatism correction for the display when the electron beam is deflected from the center. Outputs from the horizontal and vertical deflection amplifiers are connected to dynamic focus and astigmatism correction circuit 600 wherein astigmatism and focus correction signals are generated. The astigmatism correction signals drive conventional quadrupole stigmator elements 810 and 930 of CRT 800. Stigmators 810 and 830 are rotated 45 degrees relative to each other. The focus correction voltage drives CRT focus elements 820.

The high-voltage and low-voltage power supplies designated 500 and 400, respectively provide all the voltages necessary for operation of the display system.

In FIG. 2, I have provided a block diagram of dynamic focus and astigmatism correction circuit 600 according to my invention. The horizontal deflection voltage is picked off from the previously mentioned horizontal deflection amplifier 100; similarly, the vertical deflection voltage is obtained from vertical deflection amplifier 200. The +X voltage is applied to limiting amplifier 615 and the −X voltage is applied to limiting amplifier 610. Likewise, the +Y voltage is applied to limiting amplifier 620 and the −Y voltage is applied to limiting amplifier 625. The output of each limiting amplifier is coupled to stigmator 2 correction signal generator 630 which generates a correction signal of the form:

$$(AX^2 + BY^2) \tag{1}$$

The output of each limiting amplifier is also coupled to stigmator 1 correction signal generator 635 which generates a correction signal of the form:

$$(AX \cdot BY) \quad (2)$$

And, finally, the output of each limiting amplifier is coupled to focus correction signal generator 640 which generates a correction signal of the form:

$$(AX^2 + BY^2) \quad (3)$$

It is well-known to those skilled in the art that the correction signal required for defocusing can be expressed in X and Y as equation (3), the correction signal required for on-axis astigmatism can be expressed as equation (1), and the correction signal for corner astigmatism can be expressed as equation (2).

The output of each correction signal generator, 630, 635, and 640 is coupled to a conventional output amplifier designated 645, 650, and 655, respectively. The voltages from these output amplifiers are then used to drive the above-mentioned stigmator and focus elements of CRT 800.

My invention departs from the prior art by providing a novel circuit for developing the dynamic focus and astigmatism correction signal. The invention also includes means for separately adjusting for astigmatism in each corner of the CRT screen without affecting on-axis astigmatism. In order to better illustrate the novel aspects of my invention I have shown in FIG. 3 how the dynamic astigmatism correction signal, according to equation (2), is developed.

The +X voltage is fed to limiting amplifier 615, the output of which is connected through variable gain control 611 to input terminal +A of a first four-quadrant multiplier 613. The output of amplifier 615 is also coupled through variable gain control 621 to input terminal −A of a second four-quadrant multiplier 623. Similarly, the −X voltage is fed to limiting amplifier 610 which has its output connected through variable gain control 612 to input terminal −A of multiplier 613. The output of amplifier 610 is also connected through variable gain control 622 to input terminal +A of multiplier 623. The +Y voltage is fed directly to the +B input terminal of multiplier 613 and the −Y voltage is fed directly to the +B input terminal of multiplier 623. The −B input terminal of each multiplier is grounded. The output signals from multipliers 613 and 623 are added in summing amplifier 650 to produce the error correction signal of equation (2).

Absolute value amplifiers 610, 615, 620, and 625 are identical. Those used in the preferred embodiment are current-driven limiting amplifiers comprising a single PNP transistor amplifier with a diode on its output to limit the dynamic range of the amplifier to positive excursions only. These amplifiers have a gain of one for inputs greater than zero and a gain of zero for inputs less than zero. Multipliers 613 and 623 may be any conventional differential-input multipliers which exhibit four-quadrant multiplier properties. The preferred embodiment described herein utilizes MC 1495 integrated circuits. Operation of this type of integrated circuit is described in Chapter 12 of the book *Application Considerations For Linear Integrated Circuits*, edited by Jerry Embinder, Wiley-Interscience, 1970, which is herein incorporated by reference. Alternate multipliers, such as those disclosed in U.S. Pat. No. 4,156,283 for a Multiplier Circuit granted to Barrie Gilbert, May 22, 1979, and incorporated herein by reference, may be used.

My invention is straightforward so only a brief explanation of the operation thereof is provided. Those skilled in the art are well aware of the fact that a CRT screen may be regarded as a two-dimensional rectangular cartesian coordinate system. This being the case, the CRT screen may be divided into four quadrants. It is also well known that to deflect the beam to quadrant 1 the X signal must be greater than zero and the Y signal must be greater than zero; to deflect the beam to quadrant 2 the X signal must be less than zero and the Y signal must be greater than zero; to deflect the beam to quadrant 3 the X signal must be less than zero and the Y signal must be less than zero; and to deflect the beam to quadrant 4 the X signal must be greater than zero and the Y signal must be less than zero.

The X and Y signals which are proportional to the horizontal and vertical deflection of the electron beam from the CRT screen center are first modified by the limiting amplifiers. As previously mentioned, amplifiers 610, 615, 620 and 625 have a gain of one for inputs greater than zero and a gain of zero for inputs less than zero.

When the CRT beam is deflected to the top of the screen (quadrant 1 or 2), the output of amplifier 620 is proportional to the vertical deflection and the output of amplifier 625 is zero. The difference between the horizontal input signals (+A and −A input terminals) to multiplier 613 is then multiplied by the vertical deflection signal at the +B input. The output of multiplier 623 is zero since the difference between its +B and −B inputs is zero. If, more specifically, the beam is deflected to quadrant 1 of the screen, the +A input of multiplier 613 receives the +X signal scaled by the setting of variable gain control 611. Therefore, the output of multiplier 613 is the product of the +Y deflection signal and the +X deflection signal scaled by the setting of variable gain control 611. This product signal is summed with the product signal from multiplier 623 (zero) in amplifier 650 to produce the correction voltage according to equation (2). If, however, the beam is deflected to quadrant 2 of the CRT screen, the signal at the +A input of multiplier 613 is zero. The signal at the −A input is the X signal scaled by the setting of variable gain control 612. Therefore, the output of multiplier 613 is the product of the +Y deflection signal and the −X deflection signal scaled by the setting of variable gain control 612. This product signal is summed with product from multiplier 623 (zero) in amplifier 650 to produce the correction voltage according to equation (2).

It can be shown that variable gain controls 621 and 622 function in a manner identical to that described above to determine the amplitude of the product signal from multiplier 623 when the beam is deflected to quadrants 3 and 4. Thus, variable gain controls 611, 612, 621, and 622 can be used to independently adjust the amplitude of the corner astigmatism correction voltage.

It may be observed in the foregoing specification that it has not been burdened by the inclusion of large amounts of detail and specific information relative to such matters as circuitry, timing, and the like. All such information is considered to be well within the skill of the art. It will, therefore, be apparent to those skilled in the art that many changes may be made to the preferred embodiment without departing from my invention in its broader aspects. I intend the appended claims to cover all such changes as fall within the scope of my invention.

What I claim as my invention is:

1. An astigmatism correction voltage generating system for correcting astigmatism in the corners of a cathode ray tube screen, the system comprising:
   a source of horizontal deflection signals;
   a source of vertical deflection signals;
   first and second limiting amplifiers coupled to receive said horizontal deflection signals;
   third and fourth limiting amplifiers coupled to receive said vertical deflection signals;
   a first four quadrant multiplier coupled to receive the output of said first, said second, and said third limiting amplifiers;
   a second four quadrant multiplier coupled to receive the output of said first, said second, and said fourth limiting amplifiers; and
   a summing amplifier coupled to receive the output of said first and said second four quadrant multipliers and to produce a correction voltage therefrom.

2. The system according to claim 1 wherein said first, said second, said third, and said fourth limiting amplifiers have a gain of one for inputs greater than zero and a gain of zero for inputs less than zero.

3. An astigmatism correction voltage generating system for correcting astigmatism in the corners of a cathode ray tube screen, the system comprising:
   means for generating horizontal deflection signals;
   means for generating vertical deflection signals;
   first and second means coupled to receive said horizontal deflection signals for limiting the amplitude thereof;
   third and fourth means coupled to receive said vertical deflection signals for limiting the amplitude thereof;
   first four quadrant multiplying means coupled to receive and multiply the output of said first, said second and said third limiting means
   second four quadrant multiplying means coupled to receive and multiply the output of said first, said second, and said fourth limiting means; and
   means for summing coupled to receive the output of said first and said second multiplying means and for producing a correction voltage therefrom.

4. The system according to claim 3 wherein said first, said second, said third, and said fourth limiting means each comprise a limiting amplifier.

5. The system according to claim 4 wherein said first, said second, said third, and said fourth limiting amplifiers have a gain of one for input levels greater than zero and a gain of zero for input levels less than zero.

* * * * *